(12) United States Patent
Hunt

(10) Patent No.: US 6,917,426 B2
(45) Date of Patent: Jul. 12, 2005

(54) REAL-TIME WAVEFRONT SENSOR SYSTEM

(75) Inventor: Jeffrey H. Hunt, Chatsworth, CA (US)

(73) Assignee: The Boeing Company, Chicago, IL (US)

( * ) Notice: Subject to any disclaimer, the term of this patent is extended or adjusted under 35 U.S.C. 154(b) by 336 days.

(21) Appl. No.: 10/059,612

(22) Filed: Jan. 29, 2002

(65) Prior Publication Data

US 2003/0142312 A1 Jul. 31, 2003

(51) Int. Cl.⁷ .............................. G01J 4/00; G01J 1/00; G01J 1/20; G01B 9/02
(52) U.S. Cl. ...................... 356/364; 356/121; 356/491; 250/201.9
(58) Field of Search ................................ 356/450–521, 356/364–370, 327, 328, 121, 122, 121.5, 124.5; 359/245–279, 315–320, 487, 494, 497, 501, 483–485, 30, 31, 32, 33; 250/201.9, 225, 550, 227.21, 227.27, 227.28, 227.2

(56) References Cited

U.S. PATENT DOCUMENTS

| | | | | |
|---|---|---|---|---|
| 3,611,207 A | * | 10/1971 | Klahr | 359/248 |
| 3,736,046 A | * | 5/1973 | Zook | 365/121 |
| 3,744,875 A | * | 7/1973 | Haertling et al. | 359/251 |
| 3,748,597 A | * | 7/1973 | Reinhart | 359/279 |
| 3,981,587 A | * | 9/1976 | Gievers | 356/141.3 |
| 4,094,581 A | * | 6/1978 | Baldwin et al. | 359/249 |
| 4,124,278 A | * | 11/1978 | Grinberg et al. | 349/17 |
| 4,327,971 A | * | 5/1982 | Kondo et al. | 359/250 |
| 5,381,253 A | * | 1/1995 | Sharp et al. | 349/18 |
| 5,694,205 A | * | 12/1997 | Gualtieri et al. | 356/33 |
| 5,926,295 A | * | 7/1999 | Charlot et al. | 359/30 |
| 5,995,223 A | * | 11/1999 | Power | 356/495 |
| 6,545,968 B1 | * | 4/2003 | Oakley | 369/95 |

OTHER PUBLICATIONS

K. Buse and M. Luennemann, *3D Imaging: Wave Front Sensing Utilizing A Birefringent Crystal*, Physical Review Letters, Oct. 16, 2000, vol. 85, No 16, pp. 3385–3387.

* cited by examiner

Primary Examiner—Zandra V. Smith
Assistant Examiner—Gordon J. Stock, Jr.
(74) Attorney, Agent, or Firm—Shimokaji & Associates, P.C.

(57) ABSTRACT

The system includes a first polarizing element; an electro-optically driven birefringent element; a second polarizing element; an optical assembly; and, an optical-to-electronic imaging sensor assembly. The first polarizing element receives an incoming optical wavefront and provides a linearly polarized output therefrom. The electro-optically driven birefringent element receives the linearly polarized output and produces two polarization eigenwaves, an output of the birefringent element being elliptically polarized. The second polarizing element has a polarization axis perpendicular to a polarization axis of the first polarizing element. The second polarizing element receives the output from the birefringent element and provides a linearly polarized output. The optical assembly receives the output of the second polarizing element and forms a real image therefrom. The optical-to-electronic imaging sensor assembly receives the real image and provides an electronic representation thereof, which may be used for real-time reconstruction of the incoming wavefront.

17 Claims, 1 Drawing Sheet

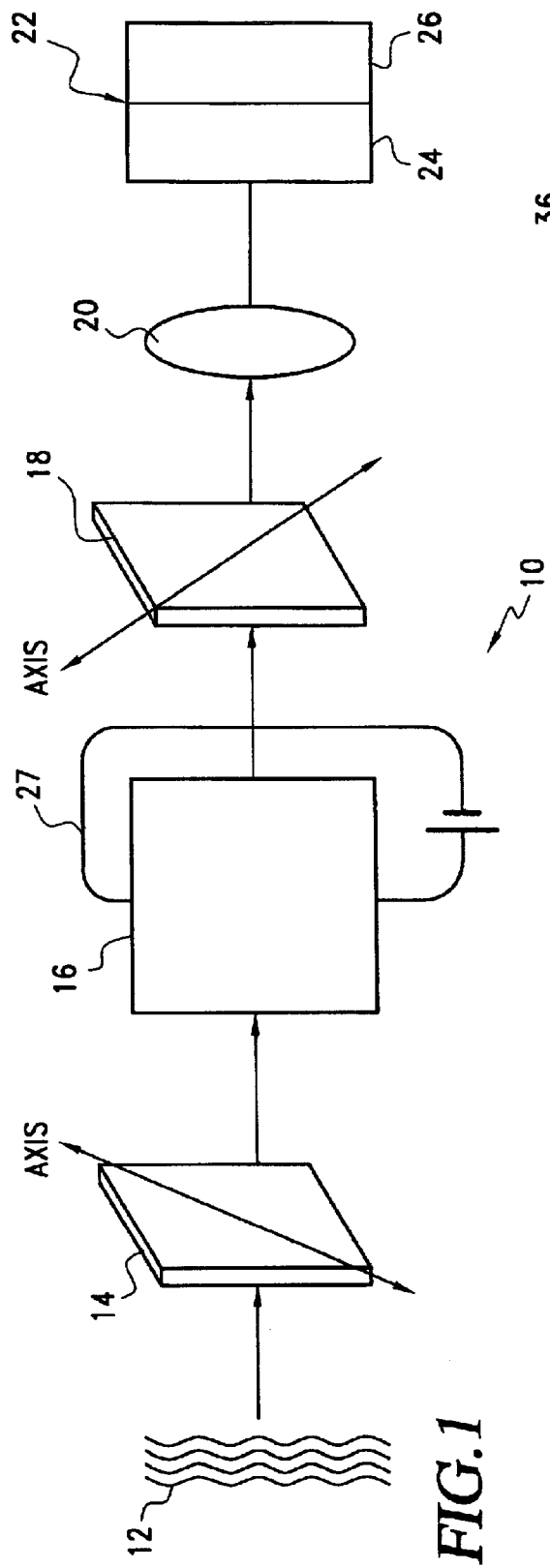
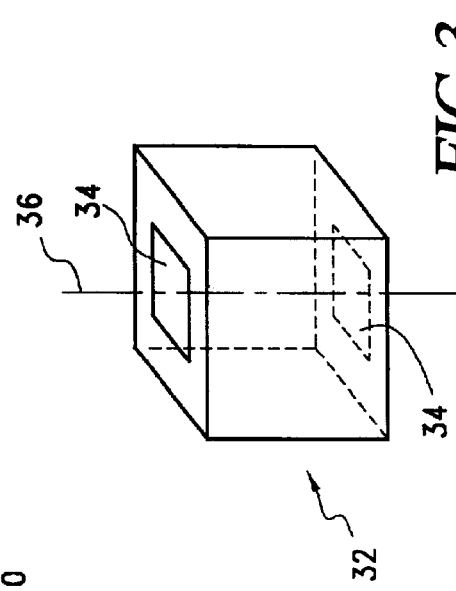
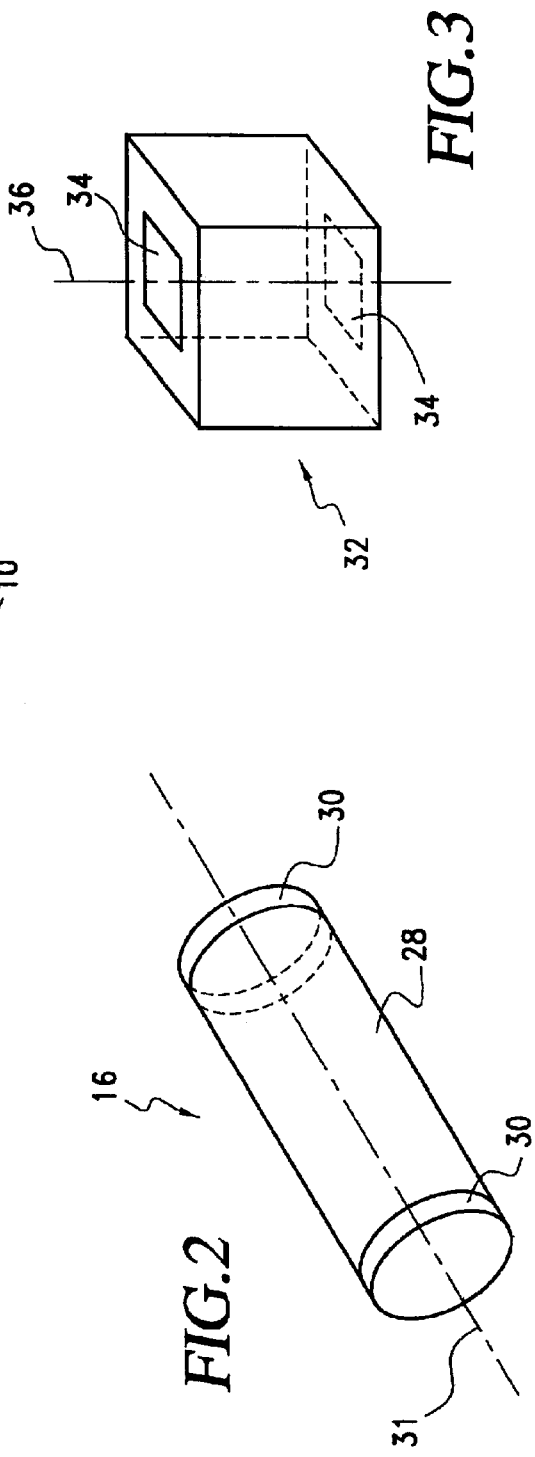

REAL-TIME WAVEFRONT SENSOR SYSTEM

BACKGROUND OF THE INVENTION

1. Field of the Invention

This invention relates to the dynamic measurement of optical wavefronts and more particularly to the real-time measurement of a temporally varying optical wavefront.

2. Description of the Related Art

There are many applications for adaptive optics systems. Optical propagation through the atmosphere can distort wavefronts. This can cause loss of information during digital transmission in optical communications. In imaging applications, such as ground based astronomy, it can lead to loss of fidelity and resolution. Manufacturing applications such as laser cutting or welding implement adaptive optics for precise control of optical energy deposition geometry.

All adaptive optics systems are basically composed of three subassemblies—a wavefront sensor, an electronic wavefront processor and an active wavefront corrector. Advances have been made on the latter two subassemblies. However, wavefront measurements are still accomplished by some means of self-measurement, such as interferometry or holography. Interferometric and holographic means work well in settings where there are strict measurements environment constraints. However, they are very sensitive to alignment and mechanical instabilities. This indicates that their utility is limited in applications where mechanical vibrations are inherent. A technique is needed to minimize these stability problems.

K. Buse and M. Luennemann, in their article entitled, 3D Imaging: Wave Front Sensing Utilizing a Birefringent Crystal, (Physical Review Letters, Vol 85, No 16, Pgs 3385–3387, Oct. 16, 2000) disclose the measurement of a wavefront utilizing a rotatable thin birefringent crystal and two polarizers. In their experiments, phase-front distortions, as small as 15 $\mu$m, are detected with a dynamic range of 3 mm and a spatial resolution of 50 $\mu$m. Such a dynamic range in spatial resolution exceeds the performance of conventional wavefront sensors of, for example, the Shack-Hartmann type.

However, use of a birefringent crystal, does not allow for the capability of providing real-time monitoring. Specifically, the Buse/Luennemann implementation calls for the mechanical rotation of the crystal in order to measure any given wavefront. Any wavefront that has a temporal dependence (e.g. one that is being modulated by atmospheric fluctuations) could not be measured this way.

SUMMARY

The real-time wavefront sensor system of the present invention, includes, in a broad aspect, a first polarizing element; an electro-optically driven birefringent element; a second polarizing element; an optical assembly; and, an optical-to-electronic imaging sensor assembly. The first polarizing element receives an incoming optical wavefront and provides a linearly polarized output therefrom. The electro-optically driven birefringent element receives the linearly polarized output and produces two polarization eigenwaves, an output of the birefringent element being elliptically polarized. The second polarizing element has a polarization axis perpendicular to a polarization axis of the first polarizing element. The second polarizing element receives the output from the birefringent element and provides a linearly polarized output. The optical assembly receives the output of the second polarizing element and forms a real image therefrom. The optical-to-electronic imaging sensor assembly receives the real image and provides an electronic representation thereof, which may be used for real-time reconstruction of the incoming wavefront.

Utilization of an electro-optically driven birefringent element allows real-time applications, for example, measurement of wavefronts changing at high-speed, e.g. atmospheric propagation. Since electronically produced changes can be induced on nanosecond scales, one can easily make >100 measurements during the one-microsecond times associated with changes in atmospheric disturbances.

BRIEF DESCRIPTION OF THE DRAWINGS

FIG. 1 is a schematic view of a preferred embodiment of the real-time wavefront sensor of the present invention.

FIG. 2 is a schematic view of an electro-optically driven birefringent element utilized by the present invention.

FIG. 3 is a schematic view of an alternate electro-optically driven birefringent element.

The same parts or elements throughout the drawings are designated by the same reference characters.

DETAILED DESCRIPTION OF THE INVENTION

Referring to the drawings and the characters of reference marked thereon, FIG. 1 illustrates a preferred embodiment of the present invention, designated generally as 10. An incoming optical wavefront 12 is received by a first polarizing element 14. The wavefront of an optical beam is generally described as the contour of constant phase over the physical cross-section of the beam. Although any optical source will have a phase associated with it, in most cases, sources will be objects, which are being imaged or will be from transmitters of digitally encoded optical beams.

The first polarizing element 14 linearly polarizes the incoming optical wavefront 12. Polarizing element 14 may comprise, for example, a polarization plate, a Brewster's angle polarizer, or a thin film polarizer. The precise polarizer to be selected depends on the particular application's engineering requirements such as polarization rejection ratio, size and weight of the polarizer, and the wavelength range over which the sensor must operate, etc.

The linearly polarized output from the first polarizing element 14 is received by an electro-optically driven birefringent element 16. The birefringent element 16 produces two polarization eigenwaves. The output of the birefringent element 16 is elliptically polarized. The birefringent element 16 may be a birefringence adjustable electro-optically active optical medium such as a Pockel cell.

A second polarizing element 18 receives the output from the birefringent element 16. The second polarizing element 18 has a polarization axis that is perpendicular to the polarization axis of the first polarizing element 14.

The linearly polarized output from the second polarizing element 18 is received by an optical assembly 20, which forms a real image therefrom. The optical assembly 20 may be, for example, a single lens assembly, a beam reducer, an image-forming telescope, refractive elements, or reflective elements. The optical assembly should be designed so that its wavefront error is less than that expected from the incoming wavefront. This should be done so that the measured wavefront is indicative of the original beam, not one with aberrations caused by the optical assembly.

An optical-to-electronic imaging sensor assembly 22 receives the real image from the optical assembly 20 and provides an electronic representation thereof, which may be used for real-time reconstruction of the incoming wavefront. The sensor assembly 22 includes a data reduction processor 24 and an optical-to-electronic imaging sensor 26. The data reduction processor 24 may include an analog signal to digital signal converter, a central processing unit capable of numerical integration and an output device that allows the user to visualize the wavefront contour being measured. As a whole, this processor 24 provides a two-dimensional integration. The optical-to-electronic imaging sensor 26 may comprise, for example, a focal plane array, a charge-coupled device (CCD) or a Vidicon tube.

With zero voltage applied, birefringence of the medium is determined by its natural structure. Birefringence can be changed by applying a voltage to the electrodes by an electronic driver element 27. The index of refraction in a birefringent medium is expressed as a tensor, $n_{ij}(E_O)$, which relates to the applied voltage by $$\frac{1}{n_{ij}^2(\vec{E})_o} = \left(\frac{1}{n_{ij}^2}\right)_o + \sum_k r_{ijk} E_{ok} + \sum_{k,l} p_{ijkl} E_{ok} E_{ol} + \cdots,$$

where $r_{ijk}$ is the linear electro-optical tensor, $P_{ijkl}$ is the quadratic electro-optical tensor, and E is the electric field associated with the applied voltage.

Since the voltage effects the index of refraction relative birefringence in the crystal can be controlled electro-optically. The electric driver responsible for putting the voltage on the crystal has several requirements. Fluctuations in the phase typically happen on the microsecond scale, so the driver must be able to change the voltages on a scale faster than that, generally, least in the 100 nanosecond range, to make real time measurements. The impedance of the crystal is very high, so the driver should apply a voltage that is purely reactive, that is, is only a voltage, ideally with no associated current. Practically, this is impossible, so the driver should incorporate a large (10 MegΩ) resistor in parallel with the crystal electrodes, so that any power generated is dissipated outside the crystal. Without the resistor, the crystal life will be shortened, with eventual catastrophic cracking resulting.

Physically, electro-optical effects arise from both ionic or molecular movement and distortion of the crystal's electron distribution induced by the applied electric field. Typically, values of $r_{ijk}$ will be in the range of $10^{-10}$ to $10^{-8}$ cm/V. The implication is that the induced refractive index change will be $10^{-5}$. Consequently, a medium that is a few centimeters long can readily induce a phase retardation of $\pi/2$, more than enough to perform the necessary phase reconstruction.

At the sensor assembly 22, variations in the intensity, the phase as a function of x-displacement and phase as a function of y-displacement each has an effect on the real image. (Here, x and y displacements refer to perpendicular directions in the plane of the sensor assembly 22.) Consequently, each of these independent quantities acts as an independent source of image modulation. To uniquely reconstruct the incoming wavefront, therefore, three images must be produced. In operation, three real images are taken for slightly different levels of voltage applied to the birefringent crystal 16. The changes in birefringence result in changes in the real image produced on the sensor assembly 22. Processing of the images, akin to that done by Buse et al, described above, allows one to uniquely reconstruct the initial wavefront.

Referring now to FIG. 2, an example of a birefringent element 16 is illustrated. The birefringent element 16 includes a substantially cylindrical electro-optically active optical medium 28 such as potassium di-hydrogen phosphate (KDP), lithium niobate (LiNbO$_3$) or lithium iodate (LiIO$_3$). Electrodes 30 are positioned at the ends of the optical medium 28. The electrodes, typically, are formed of metal foil that can be shaped to provide close contact to the cylinder. This is done to assure uniform application of the voltage to the crystal. The direction of laser propagation is parallel to the cylinder axis 31. In this configuration, the applied voltage and therefore, applied electric field, is parallel to the direction of laser propagation. This is known as the longitudinal electro-optical effect.

Referring now to FIG. 3, another example of a birefringent element is illustrated, designated generally as 32. In this case the active optical medium is cube-shaped. Electrodes 34 are positioned as shown in FIG. 3. The direction of laser propagation is perendicular to the axis 36. In this configuration, the applied voltage and therefore, applied electric field, is perpendicular to the direction of laser propagation. This is known as the transverse electro-optical effect.

Longitudinal and transverse implementations each have advantages and disadvantages. The longitudinal effect operates in crystals with large optical apertures (on the order of 1 centimeter) and few defects. Consequently, wavefronts can pass through the device with minimal demagnification and with little optical error introduced. Unfortunately, the longitudinal effect requires higher voltages (on the order of 1000 volts) making high speed switching difficult. (High speed in this case involves switching speeds less than 10 nanoseconds.) Transverse implementation requires lower voltages (on the order of 50 volts) so that switching speeds below 10 nanoseconds can be obtained. Unfortunately, transverse crystals have smaller apertures (less than 5 millimeters) and introduce more optical error. The choice of which implementation to use depends on whether speed, low optical error or alignment sensitivity is most critical.

Thus, while the preferred embodiments of the devices and methods have been described in reference to the environment in which they were developed, they are merely illustrative of the principles of the inventions. Other embodiments and configurations may be devised without departing from the spirit of the inventions and the scope of the appended claims.

What is claimed is:

1. A real-time wavefront sensor system, for measuring an incoming optical wavefront, comprising:
    a) first polarizing element for receiving an incoming optical wavefront and providing a linearly polarized output therefrom;
    b) an electro-optically driven birefringent element for receiving said linearly polarized output and producing two polarization eigenwaves, wherein the index of refraction of the birefringent element is actively modified on a scale faster than fluctuations in phase, and an output of said birefringent element is elliptically polarized;
    c) a second polarizing element having a polarization axis perpendicular to a polarization axis of said first polarizing element, said second polarizing element for receiving said output from said birefringent element and providing a linearly polarized output;
    d) an optical assembly for receiving said output of said second polarizing element and forming a real image therefrom; and
    e) an optical-to-electronic imaging sensor assembly for receiving said real image and providing an electronic representation thereof, which may be used for real-time reconstruction of the incoming wavefront.

2. The system of claim 1, further including an electronic driver element connectable to said birefringent element for providing a desired voltage thereon.

3. The system of claim 1, wherein said optical-to-electronic imaging sensor assembly comprises:
   a data reduction processor and an optical-to-electronic imaging sensor operatively connected thereto.

4. The system of claim 1, wherein said birefringent element comprises:
   a birefringence adjustable electro-optically active optical medium.

5. The system of claim 4, wherein said birefringent element further includes electrodes connected to said adjustable electro-optically active optical medium.

6. The system claim 4, wherein said adjustable electro-optically active optical medium comprises a Pockel cell.

7. The system of claim 4, wherein said electro-optically active medium is of a type that is longitudinally induced by applied voltage changes.

8. The system of claim 4, wherein said electro-optically active medium is of a type that is transversely induced by applied voltage changes.

9. A method for the real-time measurement of an incoming optical wavefront, comprising the steps of:
   a) linearly polarizing an incoming optical wavefront;
   b) producing a first set of polarization aigenwaves in response to said linearly polarized incoming optical wavefront, said eigenwaves being produced from an electro-optically driven birefringent element having a first applied voltage, wherein the index of refraction of the birefringent element is actively modified on a scale faster than fluctuations in the phase, and the output of said birefringent element is elliptically polarized;
   c) linearly polarizing said elliptically polarized output of said birefringent element;
   d) forming a first real image from said linearly polarized output of said birefringent element;
   e) providing a first electronic representation of said first real image;
   f) changing said first applied voltage to a second applied voltage thereby producing a second set of eigenwaves and a commensurate elliptical polarization;
   g) linearly polarizing said commensurate elliptically polarized output of said birefringent element;
   h) forming a second real image from said linearly polarized output of said birefringent element;
   i) providing a second electronic representation of said second real image; and,
   j) repeating steps f–i, above, to provide a third electronic representation of a third real image, which may be used, in cooperation with said first and second electronic representations, for real-time reconstruction of the incoming wavefront.

10. The method of claim 9, wherein said steps of producing said first and second sets of polarization eigenwaves, comprise utilizing a birefringence adjustable electro-optically active optical medium.

11. The method of claim 9, wherein said steps of producing said first and second sets of polarization eigenwaves, comprise utilizing electrodes connected to said adjustable electro-optically active optical medium.

12. The method of claim 10, wherein said step of utilizing an adjustable electro-optically active optical medium comprises utilizing a Pockel cell.

13. A real-time wavefront sensor system, for measuring an incoming optical wavefront, comprising:
   a) a first polarizing element for receiving an incoming optical wavefront and providing a linearly polarized output therefrom;
   b) an electro-optically driven birefringent element for receiving said linearly polarized output, wherein the index of refraction of the birefringent element is actively modified on a scale faster than fluctuations in phase, and producing two polarization eigenwaves, wherein the birefringent element comprises a birefringence adjustable electro-optically active optical medium having electrodes attached, and an output of said birefringent element is elliptically polarized;
   c) an electronic driver element connectable to said birefuingent element for providing a desired voltage thereon;
   d) a second polarizing element having a polarization axis perpendicular to a polarization axis of said first polarizing element, said second polarizing element for receiving said output from said birefringent element and providing a linearly polarized output;
   e) an optical assembly for receiving said output of said second polarizing element and forming a real image therefrom; and
   f) an optical-to-electronic imaging sensor assembly for receiving said real image and providing an electronic representation thereof, which may be used for real-time mathematical reconstruction of the incoming wavefront.

14. The system of claim 13, wherein said adjustable electro-optically active optical medium comprises a Pockel cell.

15. The system of claim 13, wherein said electro-optically active medium is of a type that is longitudinally induced by applied voltage changes.

16. The system of claim 13, wherein said electro-optically active medium is of a type that is transversely induced by applied voltage changes.

17. The system of claim 13, wherein said optical-to-electronic imaging sensor assembly comprises: a data reduction processor and an optical-to-electronic imaging sensor operatively connected thereto.

* * * * *